United States Patent [19]

Long

[11] 4,426,749

[45] Jan. 24, 1984

[54] TORCH TIP BORE CLEANING TOOL

[76] Inventor: Howard W. Long, 3436 Upland Dr., Anchorage, Ak. 99504

[21] Appl. No.: 333,067

[22] Filed: Dec. 21, 1981

[51] Int. Cl.³ .............................................. B08B 9/00
[52] U.S. Cl. ......................................... 15/93 R; 15/3; 15/104.1 R
[58] Field of Search ............. 15/3, 23, 93 R, 104.1 R, 15/3.53, 104.02, 104.05, 373; 239/117

[56] References Cited

U.S. PATENT DOCUMENTS

| | | | |
|---|---|---|---|
| 2,266,461 | 12/1941 | Jackson | 15/23 X |
| 2,503,380 | 4/1950 | Derby | 15/104.05 X |
| 2,812,531 | 11/1957 | Ashley | 15/373 |
| 3,041,647 | 7/1962 | Deacon et al. | 15/104.1 R |
| 3,774,255 | 11/1973 | Pao | 15/3.53 |

*Primary Examiner*—Edward L. Roberts
*Attorney, Agent, or Firm*—William B. Walter

[57] ABSTRACT

A tool for cleaning the outlet ports of a welding torch tip having a cylindrical wire helix which can be extended from and retracted into a housing with the helix power driven in rotation about its longitudinal axis, the helix being compressible in diameter so as to fit ports of smaller diameter than the helix.

4 Claims, 13 Drawing Figures

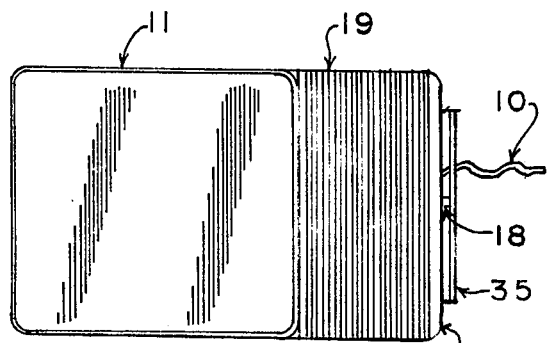
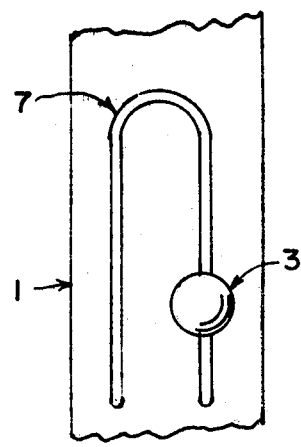
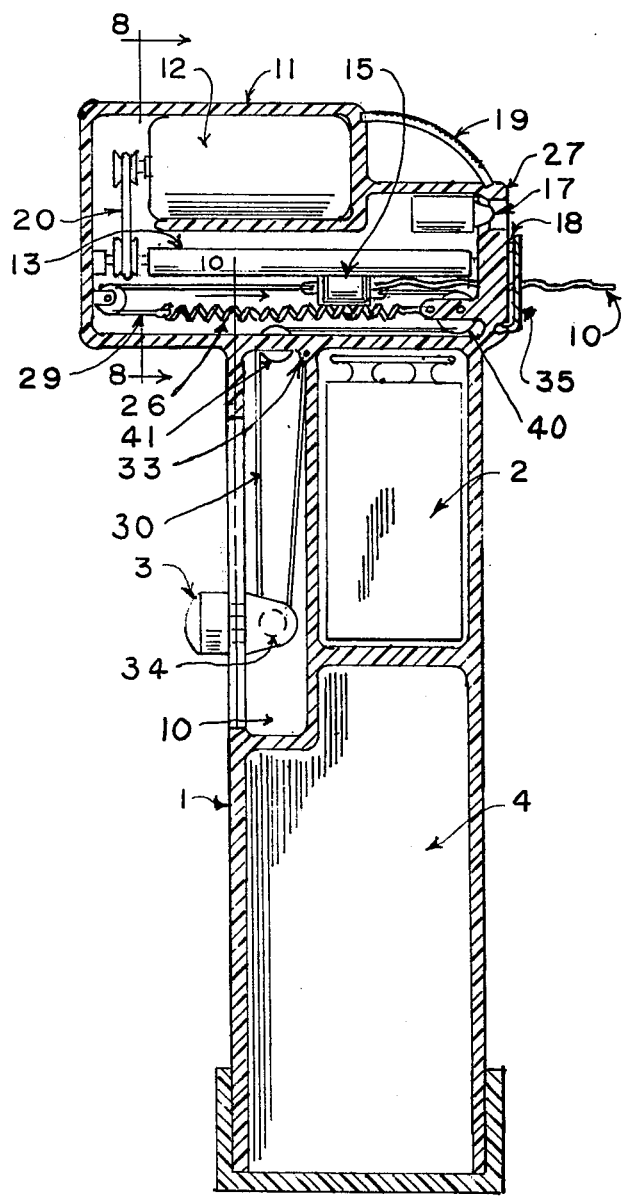
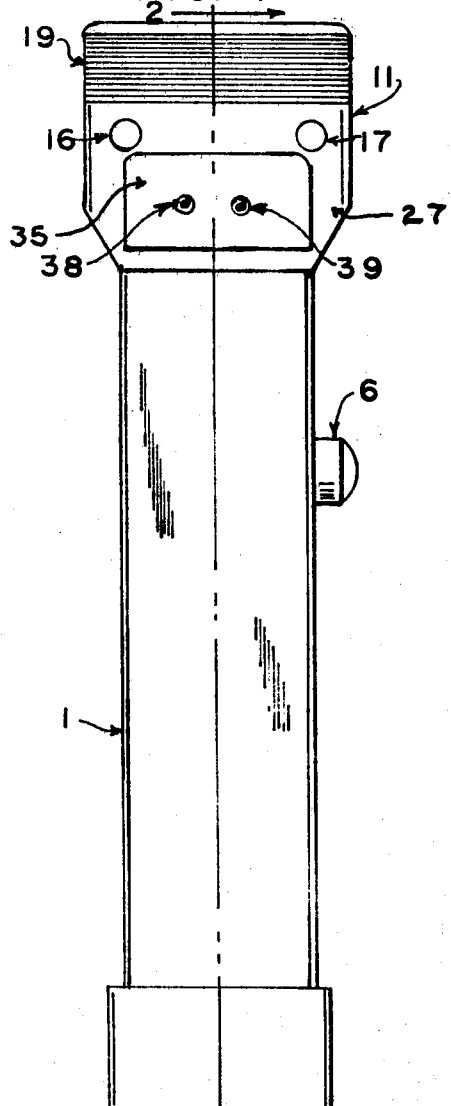

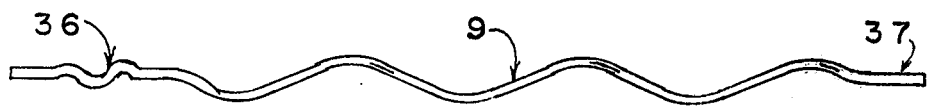
FIG. 5
FIG. 6
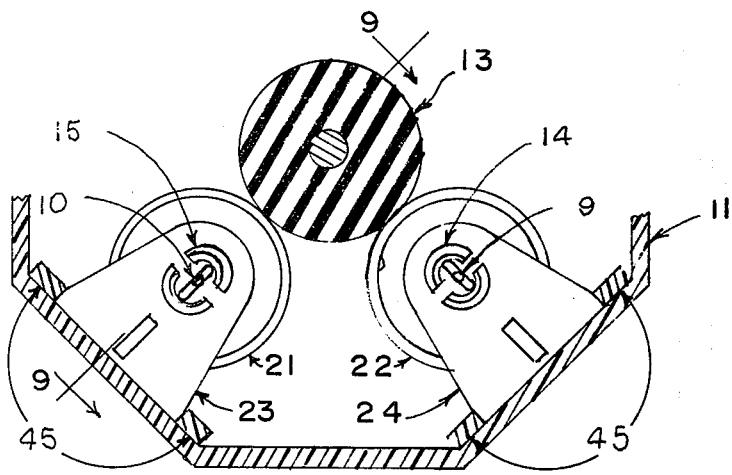
FIG. 8
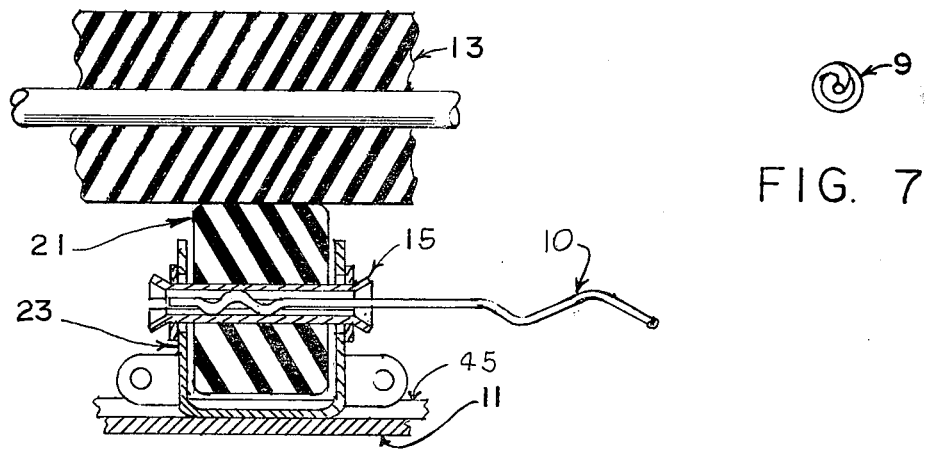
FIG. 9
FIG. 7

TORCH TIP BORE CLEANING TOOL

BACKGROUND

Efficient burning of gases emitted from torch tips, particularly those used for cutting and welding, depends upon constant maintenance of the bores of the orificies of the torch tips since the shape of the flame and the combustibility of the mixture is determined by the pressure and orifice diameter. During burning of the gases emitted from the torch tips, various forms of hard and soft extraneous matter collect in the bores such as carbon, welding flux and small particles of metal or weld spatter. In order to maintain a hot flame of the desired shape, the welder must periodically stop and clean the torch tips. This can occur as often as four or five times each hour. A common tool for this purpose is a tiny drill or wire rasp which the welder inserts into each of many bores in the torch tip, moving it back and forth to loosen and remove the extraneous matter. The small rasp is either held in a small collet on a hollow handle containing a series of rasps of varying diameters to be used for various sized bores and replacements for damaged and broken rasps, or in another version, a variety of small rasps are hung on a common pin in a small case. In one such holder, 12 different diameter sized rasps are used to cover only a range of diameters from 0.021 to 0.073 inches. Currently used sets of tip cleaners also consist of one box of fine straight wires and one box of heavier straight wires using 24 to 30 wires per box. Each of these individual cleaning elements is so small and fragile that the welder must remove his gloves to handle and use them. Once his gloves are off, he has to carefully select the wire to fit the bore before inserting it to clean the orifice. Because of his reluctance to stop welding or cutting to remove his gloves and follow these steps to maintain a proper flame including taking the wire containing box out of his pocket, opening the box, reading the wire numbers and with two fingers awkwardly guiding it pushing it in and out of each bore so as to not kink the wire or enlarge the soft exit lip, this reluctance of the welder usually results in inferior work. Hence, welder clean only when holes are stopped up, flames crooked and unmanageable. Dirty tips over-heat in seconds causing backfiring, lose the cut, lose 15-25% of cutting speed, cause flared kerfs, plate warpage, discarded tips, ragged cuts, numerous grooves on the sides of the cuts and tightly adhering slag filled with melted iron on the bottom of the cuts. The cuts must then be ground to finish and still may have a poor fit-up causing slow, excessive and rough looking welds with frequent repairs and many rejects. Gloves must be worn to protect the welder from the hot torch, melted parts and winter cold. Selecting the proper tip cleaning wire is tedious, slow and seldom accurate. There is therefore a demonstrated need for an improved method or tool for cleaning the bores of torch tips.

A study of the prior art has disclosed a variety of cleaning tools for small orifces. Such tools have reciprocating scrapers of various configurations including the oil burner nozzle pin of Bramming in U.S. Pat. No. 2,810,434, a bank of reciprocable helical rods for an air conditioning nozzle in U.S. Pat. No. 2,812,531 of Ashley and a reciprocating scraper in U.S. Pat. No. 3,393,872 of Rankin. It is doubtful that any of these approaches would be suitable for the tips of cutting torches since gas welding and cutting torch tips are made of very high purity copper for maximum heat conductivity and are therefore quite soft. These holes, from one to a dozen or more per tip are easily and frequently damaged by present cleaning methods.

BRIEF SUMMARY OF THE INVENTION

The primary object of this invention is to obtain a tool which will allow a welder to effectively clean torch tip bores without removing his gloves thus saving his time by allowing him to leave his gloves on when pausing to clean the torch tip and simultaneously protecting his hands from freezing in cold weather and from burns from the hot torch.

Another object of this invention is to provide a torch tip bore cleaning tool which will not damage the holes in the torch tip.

Another object of this invention is to obtain a torch tip bore cleaning tool in which the cleaning element can have a relatively long life with reasonable care in its use.

This invention is a one-hand held and operated tool which may be held against a torch tip from within which tool a wire helix may be extended out under control of the hand holding the tool into a hole in the torch tip and then driven in rotation by a power source within the body of the tool to wipe the inside wall of the bore clean, and the helix retracted into the body of the tool as the rotation is continued. The wire helix is selected to fit into a hole smaller than the helix diameter to exert a pressure on the inside wall of the hole when cleaning and so as to fit a wide range of holes by compression of the helix.

BRIEF DESCRIPTION OF THE DRAWINGS

In the drawings,

FIG. 1 is a front elevation of a preferred embodiment of a tool according to my invention.

FIG. 2 is a sectional view of the tool of FIG. 1 along the line 2—2 of FIG. 1.

FIG. 3 is a plan view of the tool of FIGS. 1 and 2.

FIG. 4 is a partial rear elevation of a portion of the tool of FIGS. 1-3 showing the control button arrangement for selection extension and retraction of individual cleaning elements.

FIG. 5 is an enlarged elevation of a helical cleaning element as used in the tool of FIGS. 1-4.

FIG. 6 is an enlarged elevation of another helical cleaning element at the same scale as that of FIG. 5.

FIG. 7 is a right end elevation of the cleaning element of FIG. 5.

FIG. 8 is a an enlarged right hand end elevation of a collet assembly and driving roll as seen along the section line 8—8 of FIG. 2.

FIG. 9 is a sectional view along the line 9—9 of FIG. 8.

DESCRIPTION OF THE INVENTION

Figure 10:
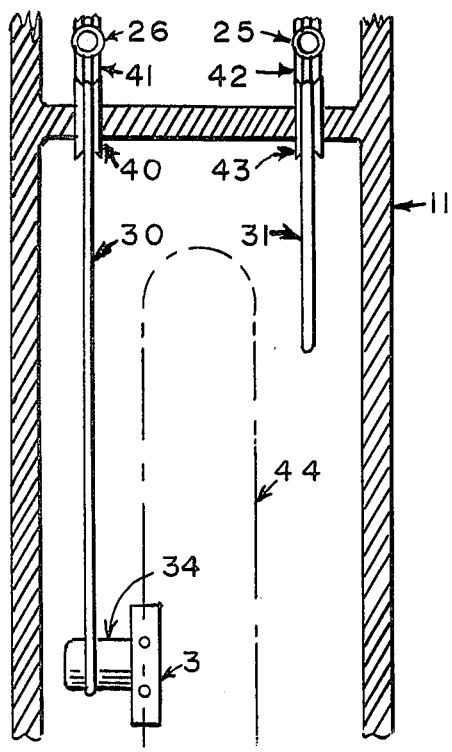
FIG. 10 is a sectional view on the line 10—10 of FIG. 2.

Referring to FIGS. 1-4, it will be noted that a preferred embodiment of the tool which constitutes the invention has a lower upright handgrip body portion 1 having space within it to accommodate a battery 2, a slidable control button 3, a storage container 4 for spare helical tip cleaning elements and an electric light switch 6.

As best seen in FIG. 1, the control button 3 may be moved along the guide slot 7 which is in the shape of an inverted U. Integral with the lower upright handgrip portion 1 of this preferred embodiment of my invention is a working head 11 which serves as a support and housing for an electric motor 12, a drive roller 13, two collets 14 and 15, two flash light bulb fixtures 16 and 17 and a normally open electric switch 18. A rounded head plate 19 is serrated to serve as a scraper for cleaning the outside face of the torch tip. A belt drive 20 operably connects the motor 12 with the drive roller 13. Each of the collets 14 and 15 is centrally mounted in a drive wheel 21 or 22 supported for rotation in brackets 23 and 24 with the collets 14 and 15 serving as shafts for the wheels 21 and 22 as best seen in FIGS. 8 and 9. The brackets 23 and 24 are held in guided relationship with the drive roller 13 by the housing 11 so that the drive wheels 21 and 22 may be driven by the drive roller 13 regardless of the position of the drive wheels 21 and 22 along the length of the drive roller 13.

Figure 11:
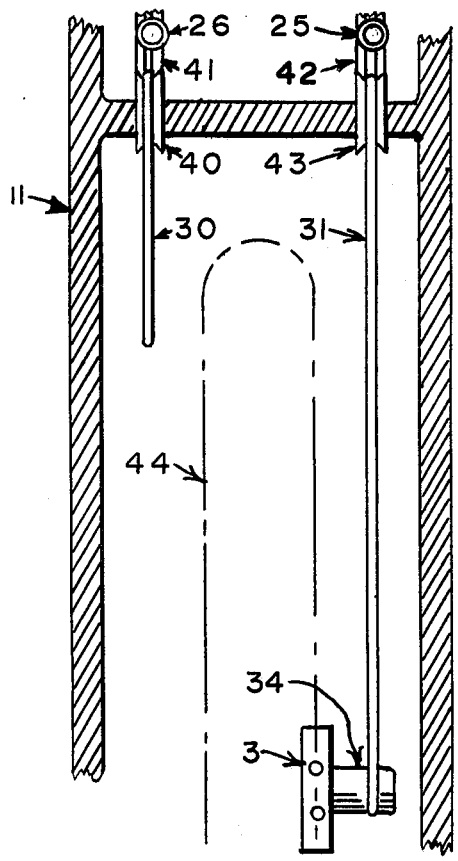
FIG. 11 is a sectional view on the line 10—10 of FIG. 2 as in FIG. 10 except that the control button is shown at the bottom of the right leg of the guide slot as represented by the centerline 44.
Figure 12:
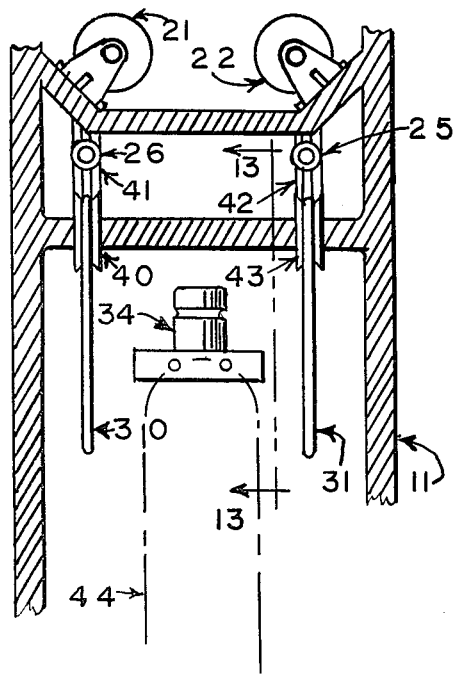
FIG. 12 is a sectional view on the line 10—10 of FIG. 2 as in FIGS. 10 and 11 except that the control button 3 is shown in a neutral position at the top center of the guide 7 as represented by the centerline 44.
Figure 13:
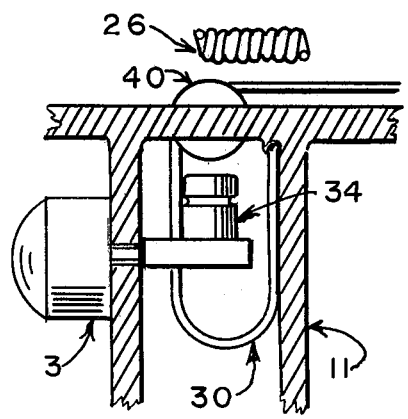
FIG. 13 is a sectional view on the line 13—13 of FIG. 12.

Each of the collet assemblies is normally held by a tension spring 25 or 26 in a retracted position distant from the working face 27 along the drive shaft 13, the collet assemblies being mounted on brackets 23 and 24 as seen in FIGS. 8 and 9 for sliding between guides 45 on canted surfaces of housing 11 as seen in FIGS. 8, 9 and 12, the collet assemblies being connected to the springs 25 and 26 by cables 28 and 29. Since FIG. 2 is a section along the line 2—2 of FIG. 1, only the cleaning element 10, collet 15, cables 29 and 30, tension spring 26, pulley 40 and pulley 41 all being on the right hand side of the tool as seen in FIG. 1 are seen, each of these elements being of necessity in the plane of the cleaning element 10. It is obvious that a similar set of extension components; collet 16, cables 31 and 32, tension spring 25, pulleys 42 and 43 serve a similar function on the other side of the tool to extend and retract cleaning element 9 and are in the plane of that cleaning element 9. A second set of cables 30 and 31 attached to the front edge of the collet assemblies and dead ended in the housing at 32 and 33 form a loop around a pin 34 in the control button 3 when the button 3 is on the side of the inverted U slot 7 closest to the collet assembly to be moved by the control button 3 towards the working face of the housing 1 or retracted within it. It should be noted that upon looking at the portion of control button 3 which is inside the housing 11 that the pin 34 is only on one side, the far side of the push button 3 to be wrapped around the pin 34, the pin 34 being shown in phantom. An electric switch operating plate 35 attached to the housing 11 along the bottom edge of the plate 35 is spring-biased in the switch open position. As seen in FIGS. 1, 2 and 10, the control button 3 has been placed close to the lower end of the left hand arm of the guide slot 7 shown as centerline 44 in FIG. 10 thus pulling on cable 30 to pull collet 15 towards the front wall of the housing 11 to partially extend the tip cleaning element 10. In FIGS. 12 and 13, the control button 3 is shown diagrammatically at the top of the guide slot 7 shown as centerline 44 where the pin 34 is out of engagement with either cable 30 or 31 so that both collets 14 and 15 are retracted by springs 25 and 26. In FIG. 11, the control button 3 is shown at the bottom of the right hand side of the guide slot 7 shown as centerline 44 with the pin 34 having engaged the cable 31 and pulled it down to extend the left hand cleaning element 9, spring 26 having pulled on cable 29 to retract right hand cleaning element 10. An electric switch operating plate 35 attached to the housing 11 along the bottom edge of the plate 35 is spring-biased in the switch open position.

Each collet 14 and 15 is a cylindrical sleeve split into two trough like sections. Being mounted in a compressible flexible rubber or rubber-like wheel 21 or 22, the split collets 14 and 15 are normally held in a closed cylindrical shape with flared entrance at each end to facilitate the introduction and removal of the helical cleaning elements 9 and 10. Thus when the helical element 9 or 10 is placed in a collet 14 or 15, the rubber drive wheel 21 or 22 in attempting to close the collet 14 or 15 will hold the cleaning element 9 or 10 in place for use.

Since welding torches vary in design, having various combinations of large and small holes to accomodate different functions, conventional hole cleaning tools have many cleaning elements, rasps or wires, each having an outside diameter for a close fit with a particular hole. This requires a time consuming effort of trial and error as the welder selects an element to fit the hole. Because the cleaning elements are so small, the welder must remove his gloves before selecting the required element and inserting it into the hole for the cleaning operation.

In my improved design of torch tip cleaning tool I provide two cleaning elements 9 and 10 which can accomodate themselves to fit a reasonable range of hole sizes. These elements 9 and 10 are helical wires, element 9 of FIG. 5 being much greater in outside diameter of the helix than that of element 10 of FIG. 6. I prefer to use a very stiff, corrosion-proof, kink-resistant, wear-resistant wire for the helix, the helix having an outside diameter which is about three times that of the wire of which it is formed. As seen in FIGS. 5 and 6, the cleaning elements 9 and 10 have a bend 36 at one end to engage the inside walls of the collets 14 and 15 and a short straight portion 37 at the other end to facilitate threading into the hole to be cleaned.

Proportions of the helix are governed by the following considerations:

1. The outside diameter of the helix must be equal to or greater than the diameter of the hole to be cleaned in order to insure a positive wiping contact with the inside wall of the hole.
2. The pitch of the helix must be sufficient to allow the helix to be introduced into a hole having a diameter less than the helix diameter. As an illustration for instance, in a closed helical coil where the pitch equals the wire diameter, each turn of the helix acts as a column with a small eccentric loading, while as the pitch is increased, the resistance of the helix to being forced into a small hole decreases with its flexibility increased.
3. Gas feed porting within the torch tip is often larger in diameter than that of the metered outlets which in turn normally have a length (of constant diameter) many times the outlet diameter. The pitch of the helix when forced into the smallest hole for which it is designed must be no greater than the length of the hole to be cleaned so as to insure wiping contact of the helix with the inside wall of the hole.

Operation of the tool is simple. The welder will load the tool with two helical elements 9 and 10 which will normally have the ability to clean the range of hole sizes in the torch tip to be used. In order to install a cleaning element 9 or 10, he will slide the control button 3 to the bottom of the arm of the inverted U slot 7 on the side of the collet 14 or 15 to be used. He will then insert the end of the helical element 9 or 10 having the retaining bend 36 through the hole 38 or 39 into the selected collet 14 or 15. When both collets 14 and 15 have been so loaded, each helical element 9 and 10 are retracted into the body of the tool with the control button 3 at the top of the inverted U slot 7. The cleaning tool is now ready for use for many hours. When the torch tip needs cleaning, which may be within a few minutes of use, the welder may remove the tool from his pocket or from a position where it is suspended by his belt or lightweight cord, and then rub the serrated plate 19 across the face of the torch tip to remove soot and weld spatter therefrom. He then will turn on the lights 16 and 17 with switch 6 to illuminate the face of the torch thus facilitating the locating of each hole to be cleaned. If the hole to be cleaned is in the range of the smaller helical element 10, he will slide the control button 3 to the side of the inverted U slot 7 bearing the collet 15 carrying element 10 so as to partially extend the element 10 outside the housing 11, and carefully insert it into the hole to be cleaned simultaneously driving the element 10 in rotation by pressing the tool against the face of the torch tip which closes the switch 18 with plate 35. As the control button 3 is slid farther down the slot 7, the helical cleaning element 10 is fully inserted into the hole and as it continues to turn, the element 10 wipes the extraneous material from the inside of the hole. As the rotating element 10 is then removed from the hole by sliding the control button 3 up the slot 7 some of the extraneous material dislodged by the wiping action will be removed with the element 10 while the remaining loosened material will be blown out of the hole by the emerging gases when the torch is used again. Although the outside diameter of the helical elements must be larger than the holes to be cleaned in order to maintain an effective wiping pressure on the inside walls of the holes, the helical elements 9 and 10 may be inserted into such holes as the leading end 39 of the wire is straight, and the helix is wound in such a direction that in effect the rotation of the collets 14 and 15 winds the helix more tightly thus decreasing the helix diameter so as to fit within the hole. The spring of the helix in attempting to return to its free state is sufficient to provide an effective wiping and burnishing of the bore. The helical elements 9 and 10 may not be inserted without rotation as the diameter of the helix would be increased by compression. Because the wire diameter is much smaller than the hole diameter, open space is left between the wire and the inside wall of the hole so that sharp particles of weld spatter, etc. will not be forced against the hole wall to score such surfaces. Since torch tips are made of soft copper, they are easily scored when cleaned by conventional tools. Because of this manner of installation, two helical elements 9 and 10 can be used to clean a fairly large range of diameter of holes.

Upon completing the cleaning of one hole, the cleaning element may be removed, preferably with the face of the tool held against the face of the torch tip so as to rotate the cleaning element 9 or 10 as it is retracted, the motor switch 18 thus being energized by the switch operating plate 35, and to insure aligning the cleaning element 10 with the hole being cleaned so as to prevent damaging the cleaning element 9 or 10. This operation is quickly repeated for each hole, selecting the helical element 9 or 10 for each hole until the torch tip is cleaned.

The tool is easily operated by the welder with his gloves on as he does not have to open any boxes or handle any small wire or drill-like elements with his hands. The two finger controls, button 3 and switch 6 are large enough to be operated with gloved hands and the motor switch 18 is easily controlled by pressing the tool against the face of the torch tip. If a helical element happens to break in such a manner that the remaining portion cannot be grasped when fully extended by the control button 3, a pin may be inserted through a hole in the back of the tool (not shown) pushing the broken piece out where it can be grasped and removed.

It will be readily understood that this tool may be readily extended for use with a larger range of holes by simply using a second such tool with two more helical elements to fit another range of holes. In other projected embodiments of a tool according to this invention, the helical elements may be rotated by a clock spring or hand squeeze or other manual operation, however, the power requirement to rotate the slender cleaning elements is so little that a self contained battery energized electric motor as shown in the drawings is preferred, especially since a manual operation could place a shear overload on the cleaning element. Although in the preferred embodiment shown herein the elements 9 and 10 extend and retract on an axis transverse to the handgrip, this is not essential to the practice of the invention. For instance, the elements 9 and 10 when in cleaning position could be co-axial with the hand grip.

In a further refinement of this invention, the wire from which the helical element is made may have longitudinal ridges in order to present sharper surfaces to the wall of the hole being cleaned.

In another embodiment of this invention, the collets, motor and handgrip portion of the tool remain in a fixed relationship. A spring-biased slidable housing normally covers each cleaning element. when the tool is held so as to press one of the housings against the face of a torch tip, the housing retracts, a hole in the housing allowing the helical cleaning element to project therethrough into a hole in the nozzle. Rotation of the element is then started to clean the bore as the element is pushed farther into the hole by pressing the tool body successively towards the nozzle.

I claim:

1. Apparatus for cleaning the orifices of torch tips comprising a cylindrical helix of wire, the pitch of which helix is sufficiently small that the helix will exert a pressure against the inside wall of one of said orifices when inserted thereinto and the pitch of which helix is sufficiently great that the helix may be led into one of said orifices having a diameter less than the outside diameter of the helix by a rotation of the helix in a direction which is in the direction of the twist of the helix thus winding the helix sufficiently to reduce the diameter of the helix to that of the orifice, and powered means operably connected to said helix for such rotation.

2. Apparatus for cleaning the orifices of torch tips as claimed in claim 1 wherein the cross-section of the wire making up the helix is irregular whereby the irregularity constitutes a scraper surface.

3. Apparatus for cleaning orifices of torch tips as claimed in claim 1 wherein said powered drive means comprises:
   a. a rotary drive motor;
   b. a power source operably connected to said motor by a control switch; and
   c. drive coupling means operably connecting said motor and said helix whereby said motor may drive said helix to rotate about the longitudinal axis of said helix as the tip of the helix is inserted into an orifice of a torch tip and continued in rotation as the helix is further inserted into said orifice with the surface of the helix wiping extraneous material free of the inside wall of the orifice.

4. Apparatus for cleaning orifices of torch tips as claimed in claim 1 also comprising a housing enclosing said helix operably attached to said powered drive means and slidable connecting means securing said helix to said powered drive means whereby said helix may be extended from and retracted into said housing while being driven by said powered drive means.

* * * * *